(12) United States Patent
Koifman et al.

(10) Patent No.: US 12,625,262 B2
(45) Date of Patent: May 12, 2026

(54) LIDAR SYSTEM WITH ENHANCED PERFORMANCE

(71) Applicant: Apple Inc., Cupertino, CA (US)

(72) Inventors: Vladimir Koifman, Rishon Lezion (IL); Tiberiu Galambos, Binyamina (IL)

(73) Assignee: Apple Inc., Cupertino, CA (US)

( * ) Notice: Subject to any disclaimer, the term of this patent is extended or adjusted under 35 U.S.C. 154(b) by 788 days.

(21) Appl. No.: 18/154,880

(22) Filed: Jan. 16, 2023

(65) Prior Publication Data

US 2023/0384450 A1    Nov. 30, 2023

Related U.S. Application Data

(60) Provisional application No. 63/345,921, filed on May 26, 2022.

(51) Int. Cl.
G01S 17/26 (2020.01)
G01S 7/481 (2006.01)
(Continued)

(52) U.S. Cl.
CPC ............ G01S 17/26 (2020.01); G01S 7/4814 (2013.01); G01S 7/4863 (2013.01); G01S 17/89 (2013.01)

(58) Field of Classification Search
CPC ........ G01S 17/26; G01S 17/89; G01S 7/4814; G01S 7/4863
See application file for complete search history.

(56) References Cited

U.S. PATENT DOCUMENTS

| | | | | |
|---|---|---|---|---|
| 10,067,055 B1 * | 9/2018 | Vakhshoori | ........... | G01J 3/4338 |
| 10,126,411 B2 | 11/2018 | Gilliland et al. | | |

(Continued)

FOREIGN PATENT DOCUMENTS

| | | | | | |
|---|---|---|---|---|---|
| CN | 112415533 A * | 2/2021 | ............. | G01S 17/14 |
| EP | 4456344 A2 * | 10/2024 | ........... | G01S 17/931 |

OTHER PUBLICATIONS

Plank et al., "High Performance Indoor Positioning and Pose Estimation with Time-of-Flight 3D Imaging," Conference Paper, 2017 International Conference on Indoor Positioning and Indoor Navigation (IPIN), pp. 1-9, year 2017.

(Continued)

*Primary Examiner* — Yuqing Xiao
(74) *Attorney, Agent, or Firm* — Meitar Patents LTD.; Daniel Kligler

(57) ABSTRACT

A LIDAR system includes a transmitter, a receiver, and a processor. The transmitter directs a sequence of illumination pulses toward a scene. The receiver including an array of photodetectors, which receive optical radiation reflected from the scene and output respective signals in response to the received optical radiation, a shutter which modulates the signals output by the photodetectors by applying a chirp shutter function, having a selected chirp period, to the signals, and a readout circuit, which samples and digitizes the modulated signals in each of a plurality of sampling windows, which span the chirp period, thereby generating a corresponding plurality of digitized output signals. The processor selects respective sampling windows for the photodetectors, and processes the digitized output signals in the selected respective sampling windows to generate a depth map of the scene.

9 Claims, 9 Drawing Sheets

(51) Int. Cl.
G01S 7/4863 (2020.01)
G01S 17/89 (2020.01)

(56) References Cited

U.S. PATENT DOCUMENTS

| | | | |
|---|---|---|---|
| 11,086,017 B2 | 8/2021 | Koifman et al. | |
| 11,175,384 B2 | 11/2021 | Gilliland et al. | |
| 2017/0372602 A1 | 12/2017 | Gilliland et al. | |
| 2018/0278868 A1 | 9/2018 | Dawson et al. | |
| 2019/0056498 A1 | 2/2019 | Sonn et al. | |
| 2021/0132229 A1* | 5/2021 | Milkov ................ | G01S 7/4863 |

OTHER PUBLICATIONS

Kadambi et al., "Rethinking Machine Vision Time of Flight with GHz Heterodyning," IEEE Access, vol. 5, pp. 1-13, year 2017.
LIPS Coproration, "LIPSedge™ DL—Best-in-One 3D Time-of-Flight Camera", pp. 1-2, Sep. 17, 2019 (downloaded from https://www.lips-hci.com/lipsedge-dl).
Koifman et al., U.S. Appl. No. 16/949,835, filed Nov. 16, 2020.

* cited by examiner

LIDAR SYSTEM WITH ENHANCED PERFORMANCE

CROSS-REFERENCE TO RELATED APPLICATIONS

This application claims the benefit of U.S. Provisional Patent Application 63/345,921, filed May 26, 2022, whose disclosure is incorporated herein by reference.

TECHNICAL FIELD

Embodiments described herein relate generally to LIDAR systems, and particularly to methods and systems for enhancing performance of LIDAR systems.

BACKGROUND

Light Detection and Ranging (LIDAR) techniques are typically used for determining ranges to objects in a scene and for creating a Three-Dimensional (3D) model of the scene.

LIDAR systems are known in the art. For example, U.S. patent application Ser. No. 16/949,835, whose disclosure is incorporated herein by reference, describes a chirp-based illumination LIDAR system having a transmitter that may include a pulsed radiation illuminator that is followed by a beam forming optics. The transmitter may be configured to output, during each illumination period of a sub-group of illumination periods, a first plurality of radiation pulses that form a decimated chirp sequence of radiation pulses; the decimated chirp sequence is a sparse representation of a chirp signal. A receiver of the system may be configured to receive, during each reception period of a sub-group of reception periods, one or more received light pulses from one or more objects that were illuminated by the one or more radiation pulses transmitted during each illumination period. The receiver may include multiple radiations sensing elements, multiple shutter circuits, and multiple processing circuits for converting the one or more received light pulses to output information; wherein the multiple shutter circuits may be configured to apply a shutter function on intermediate signals, the intermediate signals represent radiation sensed by the multiple radiations sensing elements, wherein the shutter function represents the chirp signal.

SUMMARY

An embodiment that is described herein provides a LIDAR system, including a transmitter, a receiver and a processor. The transmitter is configured to direct a sequence of illumination pulses toward a scene. The receiver including an array of photodetectors, a shutter, and a readout circuit. The photodetectors are configured to receive optical radiation reflected from the scene and to output respective signals in response to the received optical radiation. The shutter is configured to modulate the signals output by the photodetectors by applying a chirp shutter function, having a selected chirp period, to the signals. The readout circuit is configured to sample and digitize the modulated signals in each of a plurality of sampling windows, which span the chirp period, thereby generating a corresponding plurality of digitized output signals. The processor is configured to select respective sampling windows for the photodetectors, and to process the digitized output signals in the selected respective sampling windows to generate a depth map of the scene.

In some embodiments, the readout circuit is configured to integrate the sampled signals over each of the sampling windows. In other embodiments, the processor is configured to calculate a time-frequency transform for the sampling windows in a given chirp period, and to select a sampling window in the given chirp period based on partial subsets of the frequency-domain bins, corresponding respectively to the sampling windows. In yet other embodiments, the processor is configured to calculate the time-frequency transform by calculating only the partial subsets of the frequency-domain bins.

There is additionally provided, in accordance with an embodiment that is described herein, a LIDAR system, including a transmitter, a receiver, and a processor. The transmitter is configured to direct a sequence of illumination pulses toward a scene. The receiver including an array of photodetectors, a shutter, and a readout circuit. The photodetectors are configured to receive optical radiation reflected from the scene and to output respective signals in response to the received optical radiation. The shutter is configured to modulate the signals by applying an ascending chirp shutter function, having a selected chirp period, to the signals output by at least a first group of the photodetectors and simultaneously applying a descending chirp shutter function, having the same chirp period as the ascending chirp shutter function, to a load. The readout circuit is configured to sample and digitize the modulated signals to generate digitized output signals. The processor is configured to process the digitized output signals to generate a depth map of the scene.

In some embodiments the load includes a second group of the photodetectors, different from the first group of the photodetectors.

There is additionally provided, in accordance with an embodiment that is described herein, a LIDAR system, including a transmitter, a receiver, and a processor. The transmitter is configured to direct a sequence of illumination pulses toward a scene. The receiver including an array of photodetectors, a shutter, and a readout circuit. The photodetectors are configured to receive optical radiation reflected from the scene and to output respective signals in response to the received optical radiation. The shutter is configured to modulate the signals output by the photodetectors by applying a chirp shutter function, having a selected chirp period, to the signals, the shutter includes a switching circuit comprising a switched circuit comprising a differential track-and-hold or a differential sample-and-hold circuit, which is controlled to apply the chirp shutter function. The readout circuit is configured to sample and digitize the modulated signals to generate digitized output signals. The processor is configured to process the digitized output signals to generate a depth map of the scene.

In some embodiments, the switched circuit is configured to reduce flicker noise using a chopping technique. In other embodiments, the switched circuit comprises an integrating sampler comprising a transconductor stage followed by a sampler.

These and other embodiments will be more fully understood from the following detailed description of the embodiments thereof, taken together with the drawings in which:

DETAILED DESCRIPTION OF EMBODIMENTS

Overview

Figure 1:
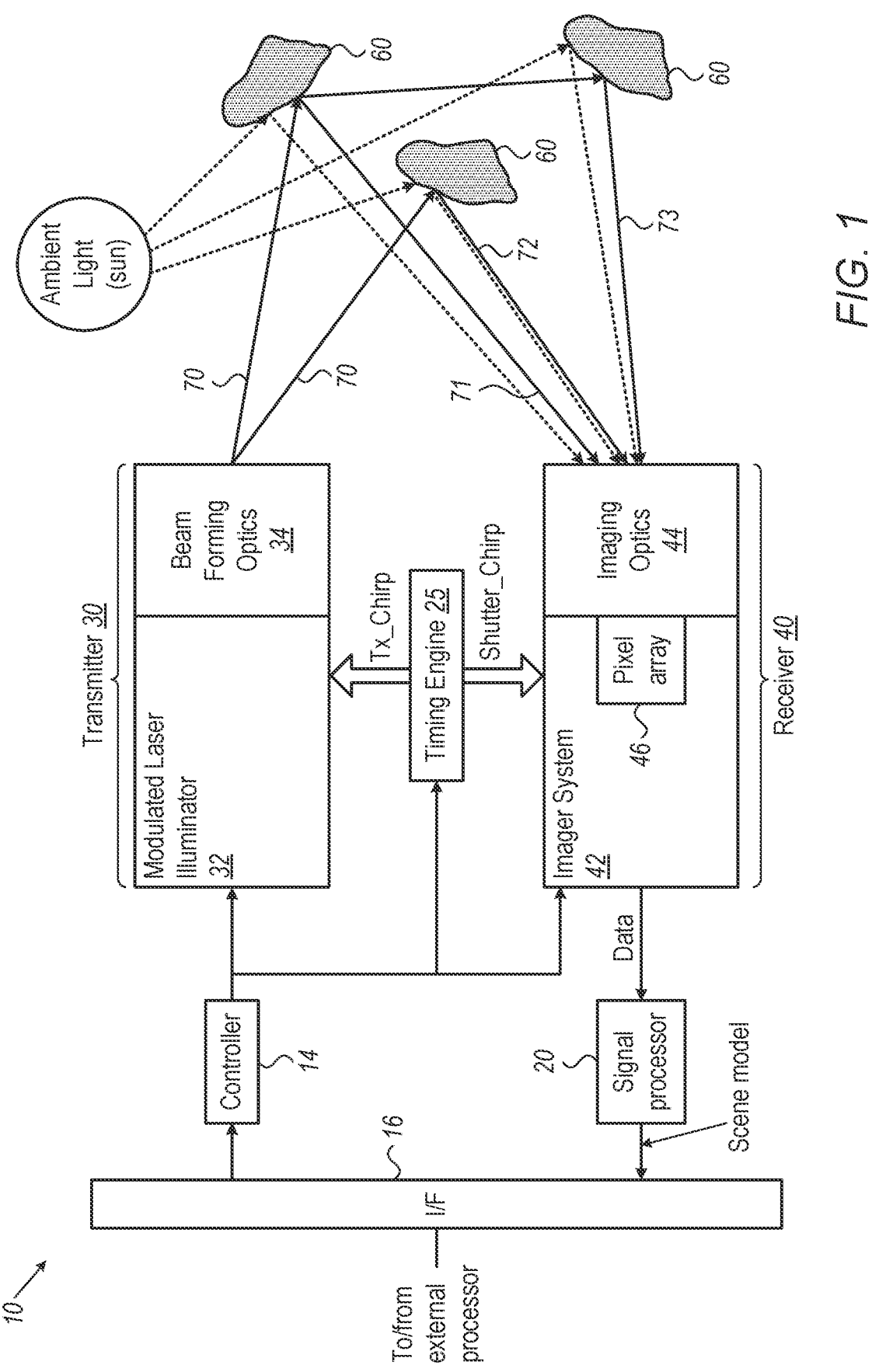
FIG. 1 is a block diagram that schematically illustrates a Light Detection and Ranging (LIDAR) system, in accordance with an embodiment that is described herein.

Light Detection and Ranging (LIDAR) systems are typically used for creating a 3D model of a scene. In some types of LIDAR systems, the scene is illuminated using an infrared pulsed laser, and the distances to objects in the scene are measured based on the time elapsing between transmitting the laser pulses and receiving corresponding reflected pulses from the objects. LIDAR systems are applicable, for example, in self-driving vehicles and other automotive applications.

Embodiments that are described herein provide improved methods and circuits in LIDAR systems.

In some embodiments, the transmitter applies to the pulses to be transmitted a chirp modulation signal that scans a predefined frequency range in the electrical domain (without modifying the laser wavelength). At the receiver, (de)-modulation of the received signal is carried out using a chirp shutter signal that is synchronized to the chirp modulation signal of the transmitter. The receiver evaluates distances to the reflecting objects based on the beat frequency of the received signal relative to the chirp shutter signal.

In some scenes, light emitted by the transmitter (illuminator) may reach the receiver (imager) on several trajectories, causing multi-path reflections. Since by using chirp modulation, multi-path reflections are associated with different beat frequencies, the receiver can separate among them.

Some scenes contain ambient light such as sunlight, which may significantly interfere with reception of the reflected light. One way to mitigate ambient light could be to use powerful illuminators. This approach, however, typically is inapplicable due to regulations related to eye safety. Other example methods to mitigate ambient light could (1) include a spectral filter at the receiver that passes only wavelengths in the vicinity of the wavelength used by the underlying laser, (2) apply spatially non-uniform illumination to concentrate the transmitted light only on a portion of the scene, (3) apply spatial non-uniformity of the receiver (imager) sensitivity, wherein readout is carried out only for the illuminated portion of the scene, thereby avoiding ambient light received when other parts of the field are illuminated, and (4) use a differential receptor with a shutter chirp having a duty cycle of 50%. The signal is seen as the difference between the positive and negative samples, which for the ambient light (except from the noise component) are equal, so that the ambient light is cancelled out (being orthogonal to the signal expected by the detector). Other examples may use coded pulses such as Walsh codes, Golay pairs or biorthogonal codes.

In some disclosed embodiments, the chirp signal that scans the entire frequency range is divided into multiple chirp sections, each of which is divided into multiple windows. The chirp sections scan corresponding subranges of the total frequency range. In these embodiments, only windows containing a reflected signal are selected, thereby reducing the amount of noise related to ambient light. In an embodiment, the signal (de)-modulated by the chirp shutter signal is integrated separately for each window across multiple chirp sections of a readout cycle. This integration scheme improves Signal to Noise Ratio (SNR) and distance measurement accuracy.

In some embodiments, since the location of the windows within the chirp section is related to depth, the processor is configured to calculate a time-frequency transform for the sampling windows in a given chirp section, and to select a sampling window in the given chirp section based on partial subsets of the frequency-domain bins, corresponding respectively to the sampling windows. In one embodiment, e.g., to reduce power consumption, the processor is configured to calculate the time-frequency transform by calculating only the partial subsets of the frequency-domain bins.

The chirp shutter signal is typically distributed to multiple (de)-modulators in the imager. When the chirp shutter signal being used is an ascending chirp signal that increases the frequency over time, the power consumption increases with time as well. This effect is undesirable and may degrade image uniformity of the LIDAR system. In some embodiments, to mitigate the effect of increasing the power consumption, the imager produces and applies a descending chirp shutter signal in synchronization with the ascending chirp shutter signal. The descending chirp shutter signal is applied to a load similar to that of the ascending chirp shutter signal. For example, the ascending and descending chirp shutter signals may be applied to a similar number of (de)-modulators in the imager. When applying both the ascending and descending chirp shutter signals simultaneously, the average power consumption becomes essentially non-varying in time.

In some embodiments, the imager comprises a (de)-modulator per photodetector. The (de)-modulator typically comprises an analog mixer that multiplies the signal produced by the photodiode by the shutter signal. In some embodiments, the mixer is replaced with a suitable switched circuit such as a Track and Hold (TAH) circuit or a Sample and Hold (SAH) circuit. Differential TAH circuits and/or differential SAH circuits may also be used. The differential TAH and SAH are advantageous because they exploit the whole signal energy and eliminate flicker noise. In some embodiments, the switched circuit reduces flicker noise using a chopping technique. In other embodiments, the switched circuit comprises an integrating sampler comprising a transconductor stage followed by a sampler.

In the disclosed techniques various approaches are employed for improving the performance of a chirp-based LIDAR system. In one approach, to mitigate noise related to ambient light, chirp sections are divided into multiple windows, of which only windows containing significant signal are selected, thereby improving SNR and distance measurements accuracy. In another approach a descending chirp shutter signal is applied simultaneously with the ascending chirp shutter signal, resulting in constant average power consumption. In yet another approach, the receiver (de)-modulator is implemented using a switched circuit rather than an analog mixer. The disclosed embodiments may be applied separately of in combination with one another.

System Description

FIG. 1 is a block diagram that schematically illustrates a Light Detection and Ranging (LIDAR) system 10, in accordance with an embodiment that is described herein.

LIDAR system 10 comprises a controller 14, a signal processor 20, an interface 16, a transmitter 30 and a receiver 40. Controller 14 manages and coordinates the operation of the LIDAR system. Signal processor 20 computes a 3D scene model of the underlying scene, based on reflections detected by receiver 40, and outputs the 3D scene model via interface 16 to an external processor, e.g., a main processor in a vehicle. Signal processor 20 may output the 3D scene model in any suitable format. For example, the 3D scene model is output in the form of a 3D point cloud, which comprises a discrete group of data points in a 3D space (e.g., a Cartesian space).

In the example of FIG. 1, controller 14 and signal processor 20 are implemented as separate processing modules. In alternative embodiments, however, the functionalities of controller 14 and signal processor 20 may be executed by a common processor.

Transmitter 30 is configured to illuminate a scene in front of the LIDAR system with a light pattern. The transmitter comprises a modulated laser illuminator 32 and beam-forming optics 34. Laser illuminator 32 produces light pulses in a desired light pattern, which is further shaped by beam-forming optics 34. In some embodiments, the beam forming optics generates a desired spatial distribution of the illuminant power.

Receiver 40 comprises an imager system 42 (also referred to herein just as an "imager" for brevity) and imaging optics 44. The imager system comprises an imaging pixel array 46, on which imaging optics 44 projects light received from the scene. In some embodiments, pixel array 46 comprises a specialized CMOS array. In the present context, the term "specialized" means that the pixels are (i) optimized for the wavelength of the laser and (ii) support the bandwidth required to operate with the modulated light. Such pixels differ from conventional pixels that just integrate the light received during the exposure time (thereby requiring a low bandwidth). For creating a 3D model of the scene, the imager system derives angular information and depth (e.g., distance) information from reflected pulses received. Based on the location of a pixel in pixel array 46, the imaging system may determine angular position to the relevant object.

In the present context, the term "pixel" refers to a light-sensitive sensor such as a photodetector, possibly together with an electronic circuit such as a (de)-modulator, a filter, and a sampler.

The LIDAR system transmits laser pulses 70 and receives some of the transmitted pulses that were reflected from objects in the scene. The imager system acquires depth information by measuring the delay between transmission times of laser pulses 70 and corresponding reception times of received laser pulses such as 71, 72 and 73.

LIDAR system 10 in FIG. 1 further comprises a timing engine 25 that controls the operation of transmitter 30 and receiver 40. For example, the timing engine coordinates the transmission of laser pulses by transmitter 30, and receiver aperture slots in imager 42.

In some embodiments, timing engine 25 provides chirp triggering signals to illuminator 32 of the transmitter for controlling the generation of chirp sequences of radiation pulses. Timing engine 25 further provides chirp shutter triggering signals to imager 42 for controlling aperture time slots in the receiver.

LIDAR system 10 may exchange any suitable information with other systems and/or devices, via interface 16. For example, an external device or system may exchange commands and notifications with controller 14, and configuration and data with signal processor 20.

In the example of FIG. 1, the underlying scene has three objects 60, illuminated by the light pattern produced by the transmitter. Other scenes may contain no reflecting objects, a single object, or any other suitable number of objects other than three. In some scenarios, objects 60 may be illuminated by additional light sources other than the LIDAR system. For example, objects 60 may be illuminated by ambient (background) light, e.g., sunlight. The ambient light may be at least partly reflected by the objects in the scene and received in the receiver along with the reflected laser pulses, Ambient light typically interferes with reception of the reflected laser pulses.

In some embodiments, to reduce performance degradation due to ambient light, the LIDAR system may transmit light pulses at a wavelength of (or close to) 940 nm (infrared light). This wavelength is advantageous because it is highly absorbed by gases in the atmosphere, thereby resulting in reduced interference caused by sunlight. In some embodiments, the receiver may filter received light using a suitable bandpass filter (in the light domain), which may be part of imaging optics 44. For example, such a bandpass filter may be centered about the wavelength of 940 nm and have a passband width of 20 nm. For Si-based detectors, a 940 mm wavelength is typically the most suitable. When other materials are used in the photodetector, (e.g., Ge, GaAs or InP), other dips in the atmospheric light spectrum might be exploited such as 1100 nm, 1400 nm, 1900 nm, and the laser wavelength is selected accordingly. The bandpass filter may attenuate light outside the passband by 40 dB, in an embodiment. Alternatively, other center wavelengths, bandwidths, and attenuation factors for the receiver bandpass filter can also be used.

Embodiments for mitigating noise related to ambient light, which are implemented using windowing in the digital domain, and other improvements applicable in LIDAR system 10, will be described in detail below.

Signal Flow in a Chirp LIDAR System

A LIDAR system such as LIDAR system 10 of FIG. 1 measures the distance to an object in a scene, by transmitting a light signal (e.g., laser pulses) and evaluating the time it takes the light signal reflected by the object to return to the receiver. The time to the object and back is referred to a Time of Flight (ToF). For an object located at a distance 'x' from the LIDAR system, the ToF is given by ToF=2x/c, wherein 'c' denotes the speed of light.

In chirp LIDAR system 10, the frequency of the transmitted signal changes over time, e.g., in a linear manner. Consequently, the instantaneous frequency of the received signal is indicative of the distance to the object from which the transmitted signal was reflected.

Figure 2:
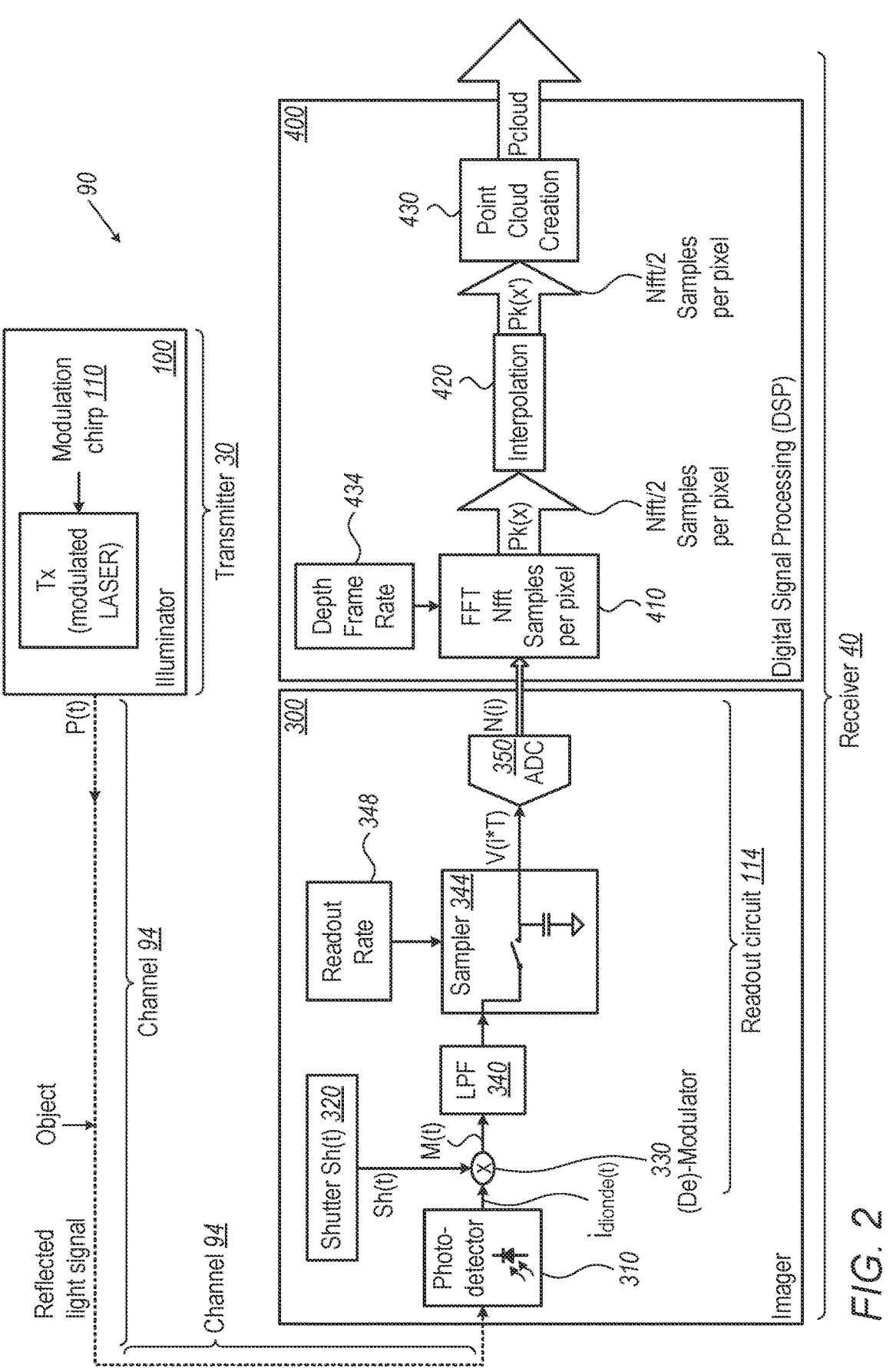
FIG. 2 is a block diagram that schematically illustrates data flow in a chirp LIDAR system, in accordance with an embodiment that is described herein.

FIG. 2 is a block diagram that schematically illustrates data flow in a chirp LIDAR system 90, in accordance with an embodiment that is described herein. The chirp LIDAR system in FIG. 2, may be used in implementing LIDAR system 10 of FIG. 1. Several modifications applicable to LIDAR system 90 for improving performance will be described in detail below.

Chirp LIDAR system 90 comprises transmitter 30 and receiver 40 (of FIG. 1). Transmitter 30 transmits a light signal denoted P(t) for illuminating the scene. At least some of the transmitted light signal is reflected by an object in the scene and is picked up by the receiver. A channel 94 carries the light from the transmitter to the object and back to the receiver.

An illuminator 100 in the transmitter (30) applies an amplitude modulation scheme to the light signal to be emitted, using a chirp modulation signal 110, wherein the frequency of the chirp modulation signal changes over time. It is noted that in the present context, amplitude modulation is applied at the electrical domain, e.g., at frequencies in the range of MHz to GHz. This is not to be confused with coherent chirp methods in which the wavelength of the light signal (e.g., the color or optical frequency) may change over time.

Illuminator 100 may use various amplitude modulation schemes. For example, chirp modulation signal 110 may comprise a sine signal whose frequency changes over time, an on-off keying (square wave) signal in which the width of the pulse changes over time, or a pulsed signal in which the width of the pulse is constant, and the spacing between the pulses changes over time. The description that follows refers mainly to chirp LIDAR systems in which the frequency or spacing between constant-width pulses changes over time.

In FIG. 2, an imager 300 of receiver 40 comprises a photodetector 310 followed by a readout circuit 114. For the sake of clarity only FIG. 2 depicts only one photodetector and a corresponding readout circuit. In practical LIDAR systems, the imager comprises any suitable number of photodetectors and corresponding readout circuits. In some embodiments, a single photodetector is used with a Two-Dimensional (2D) scanning pattern, typically a Lissajous pattern. In other embodiments, a vector photodetector may be used, with a One-Dimensional (1D) scanning pattern. In yet other embodiments, a 2D array of photodetectors is used.

Readout circuit 114 comprises a processing chain comprising a modulator 330, also refers to as a "(de)-modulator", a Low Pass Filter (LPF) 340, a sampler 344 and an Analog to Digital Converter (ADC) 350.

Photodetector 310 converts light photons into an electrical signal (e.g., electrical current signal) denoted Idiode(t). A quantum efficiency property of the photodetector specifies the number of carriers (electrons or holes) generated per photon. A responsivity property of the photodetector specifies the ratio between the electrical current output by the photodetector and the total light power falling upon the photodetector.

In the present example, (de)-modulator 330 comprises an analog mixer that modulates the electrical signal produced by the photodetector by multiplying the electrical signal by a chirp shutter signal provided by shutter 320. The chirp shutter signal is represented by a shutter function Sh(t). The chirp shutter signal is synchronized to the chirp modulation signal of the transmitter. The signal output by (de)-modulator 330 is denoted M(t). In some embodiments, the frequency of the chirp shutter signal is shifted (by a constant frequency shift value) relative to the frequency of the chirp modulation signal.

The signal M(t) contains a low-frequency sine wave signal and a high-frequency sine wave signal, wherein both the low-frequency and the high-frequency depend on the ToF. LPF 340 is configured to pass the desired low-frequency sine wave signal and to reject the undesired high-frequency sine wave. In some embodiments, LPF 340 is implemented by accumulation (integration) of the demodulated signal M(t).

Sampler 344 samples the low-frequency sine wave signal output by the LPF in accordance with a readout cycle scheduled by a readout rate producer 348. As will be described below, a single readout cycle contains one or more chirp sections during which the signal M(t) is accumulated (e.g., integrated), and the accumulated signal is sampled at the end of the readout cycle. In the figure, the $i^{th}$ analog sample is denoted V(i·T), wherein 'T' denotes the sampling interval and 'i' denotes the sample index. ADC 350 converts (e.g., quantizes) the analog samples into digital samples having a suitable resolution, e.g., 10 or 12 bits per sample. The digital sample corresponding to an analog sample V(i·T) is denoted N(i).

A DSP 400 of receiver 40 comprises a Fast Fourier Transform (FFT) module 410, an interpolator 420, and an output formatter—a point cloud creator 430 in the present example. FFT 410 receives groups of Nfft digital samples from ADC 350, and outputs corresponding groups of Nfft/2 bins denoted Pk(x). In a practical LIDAR system that comprises multiple photodetectors, each photodetector requires transforming Nfft digital samples into Nfft/2 bins using FFT module 410 (or using multiple FFT modules 410). Depending on implementation, the FFT bins may be real-valued or complex-valued. Using only Nfft/2 FFT bins is possible because with a symmetric spectrum half of the FFT bins contain all the spectral information.

A depth frame rate generator 434 schedules depth frames of Nfft readout cycles, resulting in Nfft/2 FFT bins per photodetector in each readout cycle. A peak at some FFT bin is indicative of the frequency of the received signal and therefore also of the ToF or distance to the object.

The bin resolution of FFT 410 is given by $\Delta f=1/(Nfft \cdot T)$. It can be shown that the distance resolution at the FFT output is given by $0.5 \cdot c/(fmax-fmin)$, wherein fmin and fmax denote the minimum and maximum frequencies linearly scanned by the chirp modulation signal.

Interpolator 420 interpolates over the peak FFT bin and one or more neighbor bins for increasing the accuracy of the depth measurement. The interpolator output is denoted Pk(x'). Interpolator 40 may apply any suitable interpolation method, e.g., linear interpolation. Point cloud creator 430 produces a point cloud output based on the interpolated FFT bins.

Although in the present example, an FFT module transforms the digital samples into a frequency domain, this is not mandatory. In alternative embodiments other transform methods can be used such as, for example, a wavelet transform.

In some embodiments LIDAR system 90 operates in accordance with a timing schedule as described herein. To allow signal accumulation at the receiver, the full chirp cycle scanning linearly the full frequency range, is divided into multiple chirp sections, wherein each chirp section scans a subrange of the entire frequency range. The transmitter repeats transmission in accordance with a given chirp section Q times before starting transmission in accordance with the subsequent chirp section. At the receiver, the readout cycle for generating a single analog sample corresponds to accumulation of the received signal over Q repetitions of the same chirp section. At the end of the readout cycle the accumulated signal is sampled once and provided to the ADC for producing a single digital sample. More details on using chirp sections are described in U.S. patent application Ser. No. 16/949,835 cited above.

In some embodiments the transmitter applies decimated chirp techniques as described in U.S. patent application Ser. No. 16/949,835 cited above. With decimated chirp, a repetition period of transmission is restarted at the beginning of each chirp section. By using decimated chirp, the laser repetition rate remains below the maximum repetition rate permitted.

A LIDAR Receiver Designed to Mitigate Ambient Light

The accuracy of depth measurements in LIDAR systems are mainly limited due to ambient light. Specifically, noise associated with the ambient light disrupts the interpolation calculation among FFT bins (performed by interpolator 420), which in turn reduces the accuracy of depth measurements.

In some embodiments, to mitigate ambient light, the receiver divides each chirp section into K windows (K being an integer larger than one). Neighboring windows in the same chirp section may partially overlap with one another, in an embodiment. The received signal is accumulated separately for the different K windows, resulting in K digital samples in each readout cycle per photodetector. This is in contrast to conventional un-windowed solution in which a single digital sample is generated in each readout cycle). In measuring the depth, a window containing a peak FFT bin is selected, and other windows are discarded. The selected window carries all of the reflected laser signal, but only about 1/K of the noise related to ambient light in the chirp section. The windowing approach therefore result in improving Signal to Noise Ratio (SNR), reducing FFT peak detection failure rate, and increasing the FFT bin interpolation accuracy.

Figure 3:
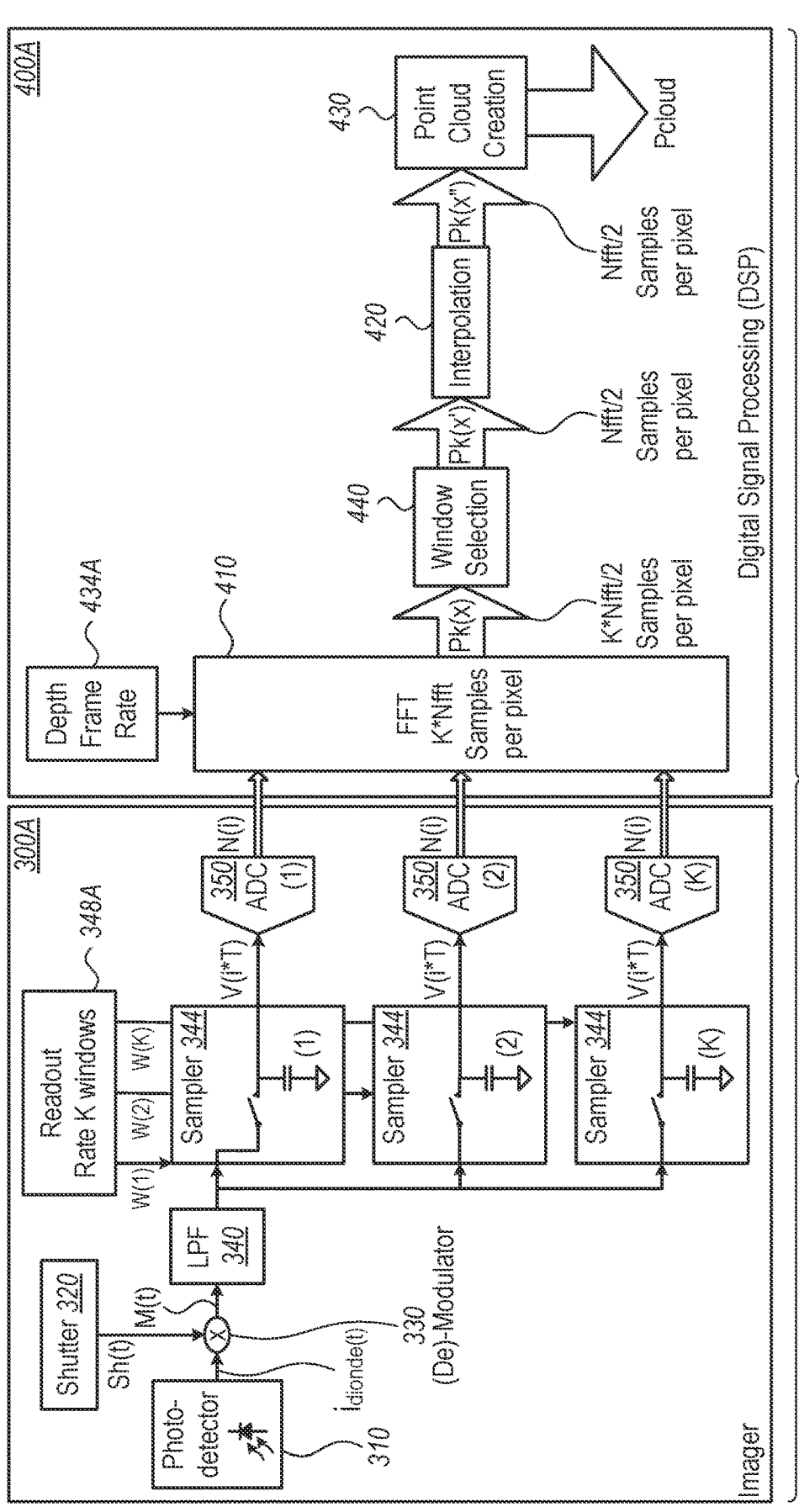
FIG. 3 is a block diagram that schematically illustrates a receiver mitigating ambient light by dividing chirp sections into multiple windows, in accordance with an embodiment that is described herein.

FIG. 3 is a block diagram that schematically illustrates a receiver 40A mitigating ambient light by dividing chirp sections into multiple windows, in accordance with an embodiment that is described herein.

Receiver 40A comprises an imager 300A and a DSP 400A. In imager 300A, photodetector 310, shutter 320, (de)-modulator 330 and LPF 340 are essentially the same or similar to corresponding elements in imager 300 of FIG. 2. Imager 300A comprises a readout rate producer 348A, multiple (e.g., K) samplers 344, and multiple (e.g., K) ADCs 350. The readout rate producer divides each chirp section into K windows denoted W(1) . . . W(k). The signal output by LPF 340 is provided to all samplers 344. Each of the K samplers, however, is enabled for sampling only during its corresponding window. The samples in each window are accumulated over one or more (e.g., Q) chirp sections of a readout cycle, separately from other windows, and the K accumulated signals are provided to K respective ADCs. In accordance with the above scheme, K digital samples are produced per a readout cycle (per a photodiode).

DSP 400A comprises a depth frame rate generator 434A that controls FFT 410 to transform Nfft digital samples of each window into Nfft/2 bins (overall K·Nfft/2 bins per readout cycle). A window selector 440 selects the Nfft/2 bins of one of the K windows. For example, window selector 440 may select the window for which a certain group of the FFT bins has a bin with the highest amplitude among the K windows. Since the time (or index) of each window within the chirp section is directly related to depth, the final FFT is composed by choosing for each chirp section the FFT of the corresponding time window. For example, a window that spans a duration from $t_i$ to $t_{i+1}$ (i being the window index), relative to the start time of the chirp section, contains reflections corresponding to depth ranges from $x_i = c \cdot t_i/2$ to $x_{i+1} = c \cdot t_{i+1/2}$, meaning that from this FFT window only the frequency bins corresponding to that depth range are relevant. Moreover, in some embodiments, to save power, only the FFT bins related to the time duration of the window are actually computed.

Interpolator 420 interpolates multiple FFT bins of the selected window for increasing the accuracy of the depth reading. Point cloud creator 430 produces a point cloud output based on the interpolated FFT bins.

Figure 4:
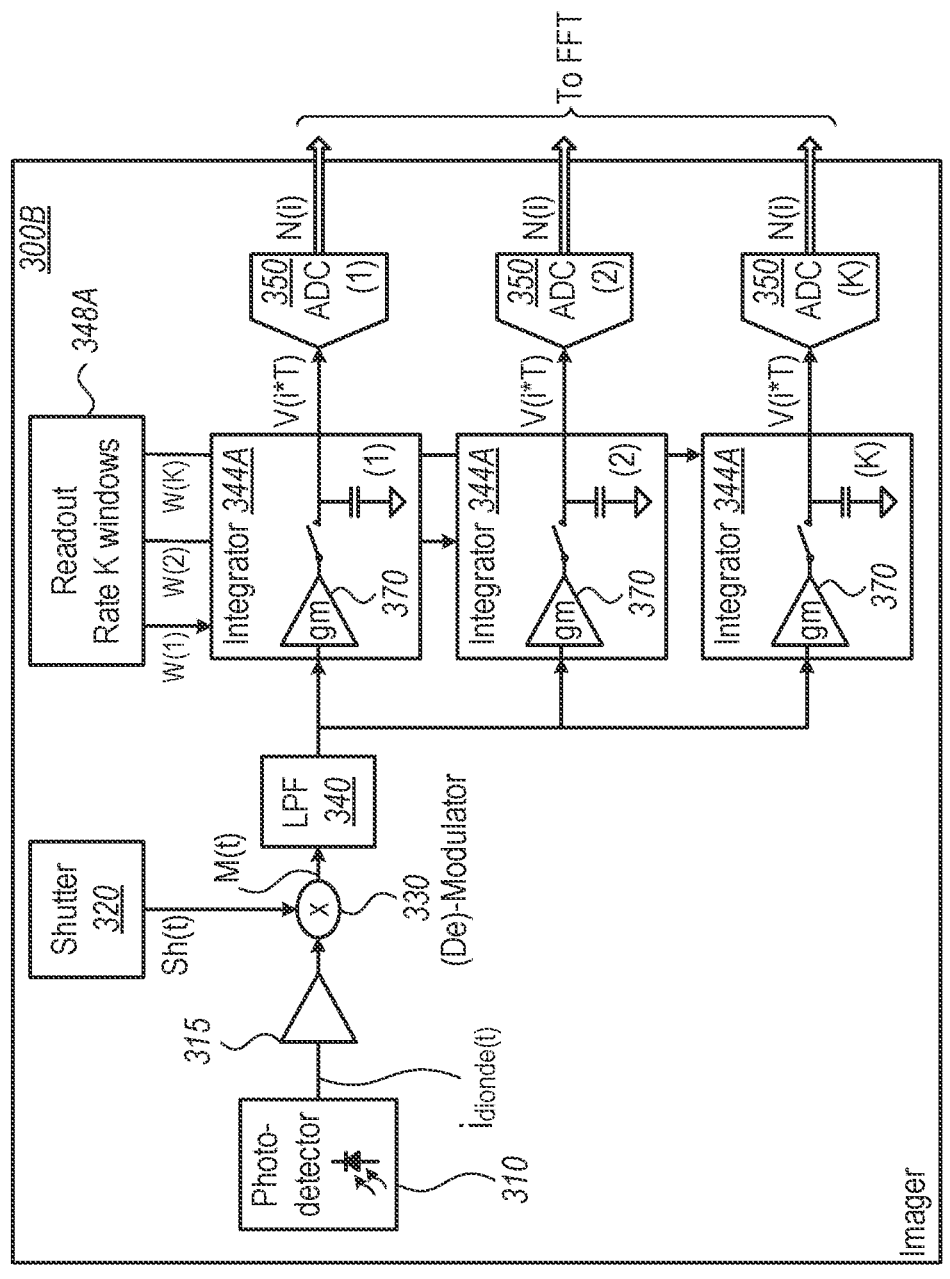
FIG. 4 is a block diagram that schematically illustrates a variant imager, in accordance with an embodiment that is described herein.

FIG. 4 is a block diagram that schematically illustrates a variant imager 300B, in accordance with an embodiment that is described herein. In one aspect, imager 300B differs from imager 300A of FIG. 3 by including an amplifier 315 that amplifies the signal output by the photo detector prior to modulation by (de)-modulator 330. In another aspect, imager 300B differs from imager 300A by using an integrating sampler 344A instead of a regular sampler 344. The integrating sampler is built from a transconductor stage gm (370) followed by a sampler. The transconductor translates input voltage to output current. When the switch of the sampler is open, the capacitor is reset to a zero voltage (using another switch—not shown in the figure). When the switch is closed, the capacitor integrates the output current of the transconductor so that the voltage across the capacitor is given by Vcap=Integral (gm·VLPF·dt). In some embodiments, LPF 340 may be omitted because the integration by integrating sampler 344A is sufficient.

The inclusion of amplifier 315 and integrators 370 assist in detecting low-power reflections. It is noted that although in FIG. 4 the imager includes both amplifier 315 and integrators 370, this configuration is not mandatory. In alternative embodiments, the imager may include amplifier 315 with regular samplers rather than integrating samplers 344A, or use integrating samplers 344A without amplifier 315.

Figure 5:
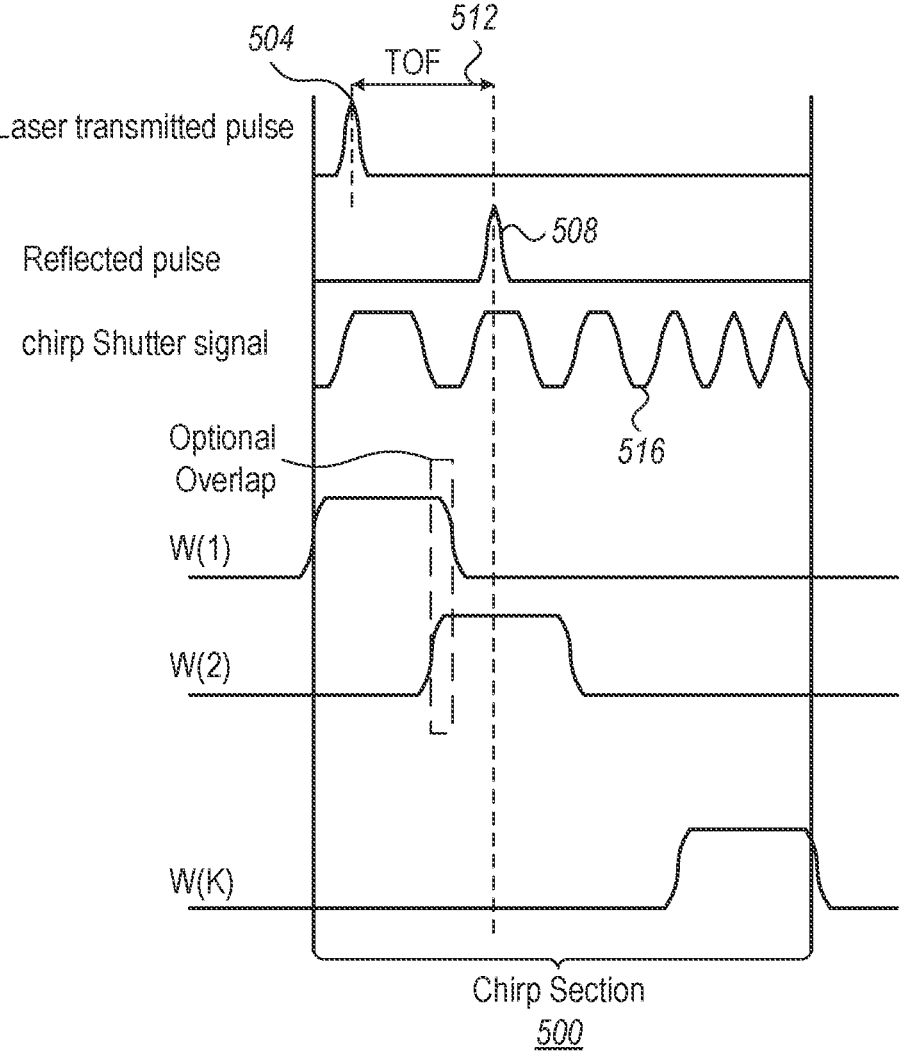
FIG. 5 is a diagram that schematically illustrates a chirp section divided into multiple windows, in accordance with an embodiment that is described herein.

FIG. 5 is a diagram that schematically illustrates a chirp section 500 divided into multiple windows, in accordance with an embodiment that is described herein.

In the example of FIG. 5, the laser transmitter is configured to transmit a single laser pulse 504 within each chirp section (e.g., chirp section 500). Depending on the distance to the object, a reflection signal 508 of the transmitted pulse is received after a TOF period 512. Chirp section 500 is divided into K windows denoted W(1) . . . W(K), e.g., by readout rate producer 348A. Any suitable integer number K of windows can be used, e.g., K=10 (or even larger) in an embodiment. Neighboring windows may overlap with one another so as not to miss a reflection at a window edge. In the present example, a chirp shutter signal 516 passes reflection signal 508 within the second window W(2). Consequently, window selector 440 selects the FFT output corresponding to window W(2) and all the other windows are discarded. Since in this scheme the integration time is K times shorter compared to integration along the entire chirp section, the amount of shot noise (having a Poisson distribution) associated with ambient light is reduced by a factor that (approximately) equals the square root of K.

As noted above, the signal is integrated for each window across multiple chirp sections that scan a common subrange of the entire chirp, before being sampled.

In some embodiments dividing the chirp sections into windows may be combined with decimated chirp techniques described in U.S. patent application Ser. No. 16/949,835 cited above. Next are described example variants of imager 300A.

Reducing Variations in Power Consumption Caused by the Chirp Shutter Signal

The chirp shutter signal produced by shutter 320 is typically distributed to all (de)-modulators 330 of imager 300. Since power consumption depends on the chirp frequency, the power (or electrical current) consumption becomes time dependent because of the chirp shutter signal. As a result, the Internal Resistance (IR) drop is also time dependent, which negatively affects the image uniformity of the LIDAR system.

In some embodiments, to compensate for the effect of the ascending chirp shutter signal, imager 300 produces a descending chirp shutter signal that is synchronized to the ascending chirp shutter signal. Moreover, the descending chirp shutter signal is applied to a load similar to the load circuit to which the ascending chirp shutter signal is applied. It is noted that the ascending and descending chirp shutter signals are applied synchronously to one another in imager 300 of the receiver and in illuminator 100 of the transmitter.

In one embodiment, the descending chirp shutter signal is applied to a load comprising a dummy shutter circuit. In this embodiment, the overall power consumption may increase due to the power consumed by the additional dummy shutter circuit. In another embodiment, one subset of (de)-modulators 330 in imager 300 is applied the ascending chirp shutter signal, while another different subset of (de)-modulators 330 is applied the descending chirp shutter signal.

Although in the present example, the original chirp shutter signal is an ascending chirp signal and the additional chirp shutter signal is a descending chirp signal, this is not mandatory. In alternative embodiments, the original and added chirp shutter signals may be descending and ascending chirp shutter signals, respectively.

Figure 6:
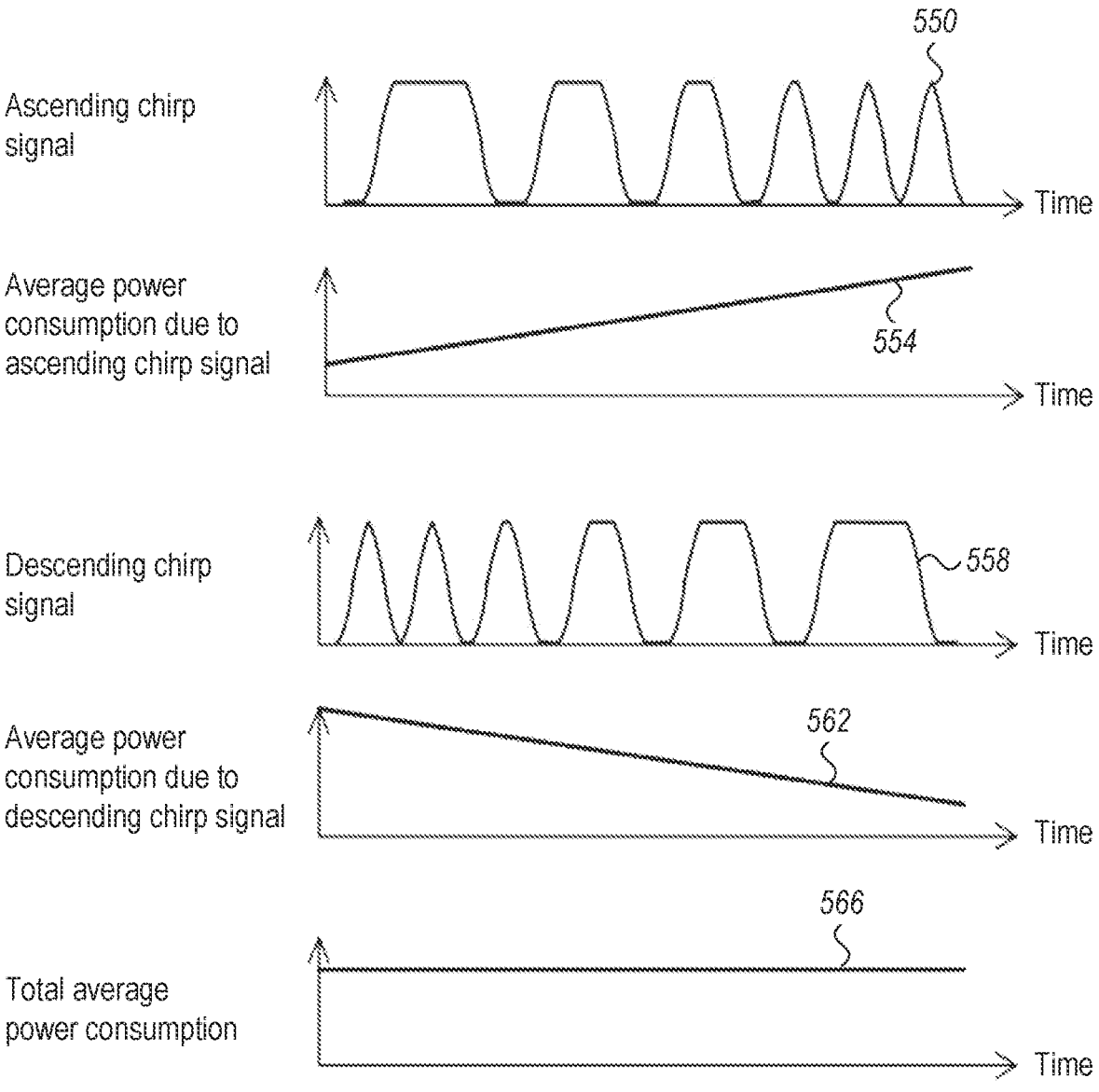
FIG. 6 is a diagram that schematically illustrates chirp signals and related average power consumption, in accordance with an embodiment that is described herein.

FIG. 6 is a diagram that schematically illustrates chirp signals and related average power consumption, in accordance with an embodiment that is described herein. FIG. 6 depicts an ascending chirp signal 550 whose frequency increases linearly with time, in which case the resulting average power consumption 554 also increases linearly with time. FIG. 6 further depicts a descending chirp signal 558 whose frequency decreases linearly with time, resulting in average power consumption 562 that also decreases linearly with time. The total average power consumption 566 is the instantaneous sum of the separate average power consumptions 554 and 562, which is constant (or in practice close to constant) over time.

Imager (De)-Modulator Implemented Using a Switched Circuit

In the embodiments described above, (de)-modulator 330 was implemented using an analog mixer that multiplies the signal produced by the photodetector by the chirp shutter signal Sh(t). Next are described alternative implementations of (de)-modulator 330 using various types of switched circuits. The switched circuits may be advantageous compared to using the mixer for various reasons such as: (i) their implementation simplicity, (ii) they typically consume less power than the mixer (because no DC biasing current is involved), and (iii) they have improved accuracy because the shutter signal is seen in terms of timing (edge position).

Figure 7B:
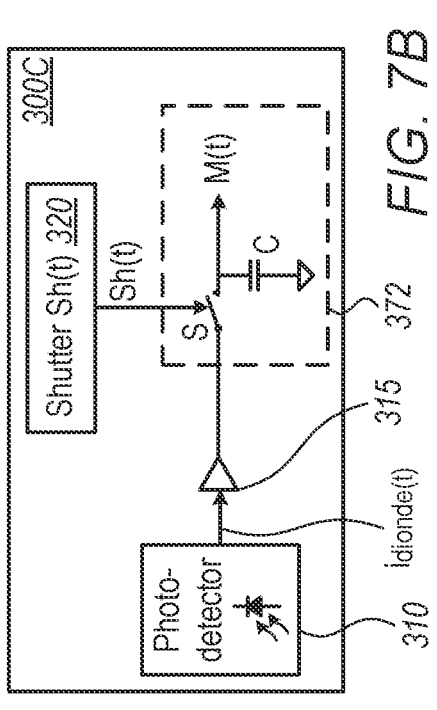
FIGS. 7A and 7B are block diagrams that schematically illustrate imagers in which the (de)-modulator is implemented using a Track-and-Hold (TAH) circuit.
Figure 7A:
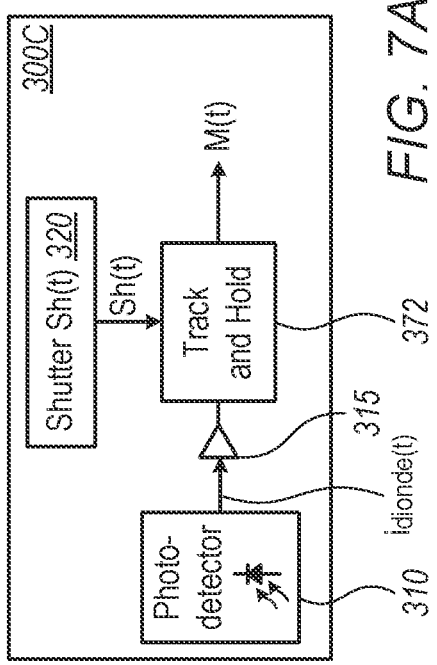

FIGS. 7A and 7B are block diagrams that schematically illustrate imagers (300C) in which the (de)-modulator is implemented using a Track-and-Hold (TAH) circuit. In FIGS. 7A and 7B a TAH circuit 372 receives the analog signal from the photodetector (or from amplifier 315) as input. Under the control of the chirp shutter signal Sh(t), the output of the TAH circuits tracks the input signal or holds the last value tracked of the input signal.

TAH circuit 372 can be implemented in various ways. For example, in FIG. 7B, the TAH circuit is implemented using a switch S and a capacitor C. In this implementation the energy of any pulse that arrives during the time the shutter signal is low is lost and not integrated (half of the time for a 50% duty cycle shutter function).

Figure 8B:
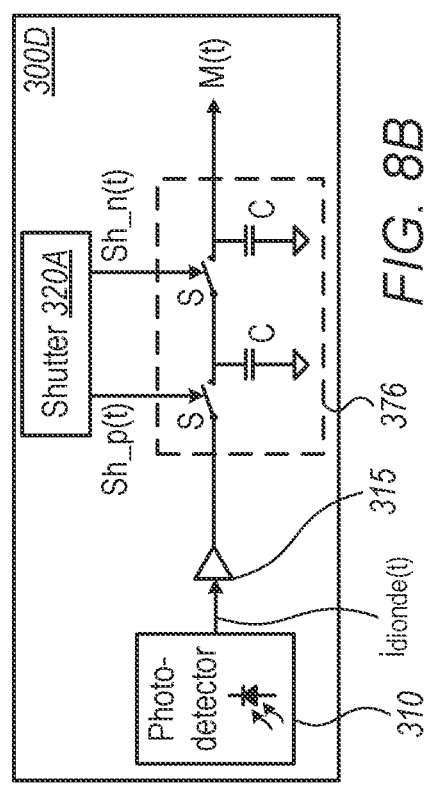
FIGS. 8A and 8B are block diagrams that schematically illustrate imagers in which the (de)-modulator is implemented using a Sample-and-Hold (SAH) circuit.
Figure 8A:
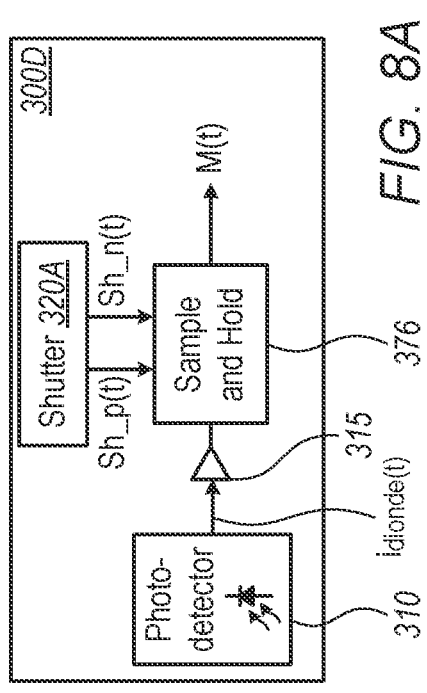

FIGS. 8A and 8B are block diagrams that schematically illustrate imagers (300D) in which the (de)-modulator is implemented using a Sample-and-Hold (SAH) circuit. In FIGS. 8A and 8B a SAH circuit 376 receives the analog signal from the photodetector (or from amplifier 315) as input. Under the control of two chirp shutter signals Sh_p(t) and Sh_n(t), the output of the TAH circuit samples the input signal and holds the last value sampled. The signals Sh_p(t) and Sh_n(t) are in opposite phases, meaning that when Sh_p(t) is high, Sh_n(t) is low, and vice versa.

SAH circuit 376 can be implemented in various ways. For example, in FIG. 8B, the SAH circuit is implemented using two switches S and two capacitors C. The switches operate in opposite phases so that when one switch is closed the other switch is open. In some embodiments, the shutter produces a single control signal Sh(t), e.g., serving as Sh_p(t), and the other control signal, e.g., Sh_n(t) is derived from Sh(t) using a logical inverter (not shown).

In some embodiments, to exploit the full signal energy, the imager employs differential TAH and SAH circuits, as described herein. Using the differential TAH and SAH circuits also reduces or eliminates flicker noise, also referred to as "1/f noise", which is a low-frequency noise for which the noise power is inversely proportional to the frequency. Reducing flicker noise may be achieved using chopping, which is a technique for reducing amplifier offset voltage, but since flicker noise is a low-frequency noise, it is effectively reduced by the chopping technique. Similarly, with an offset voltage method, the DC signal together with the low frequency flicker noise are modulated by the chopping, and thus transferred to a (high) frequency that is outside the bandwidth of the given amplifier.

Figure 9A:
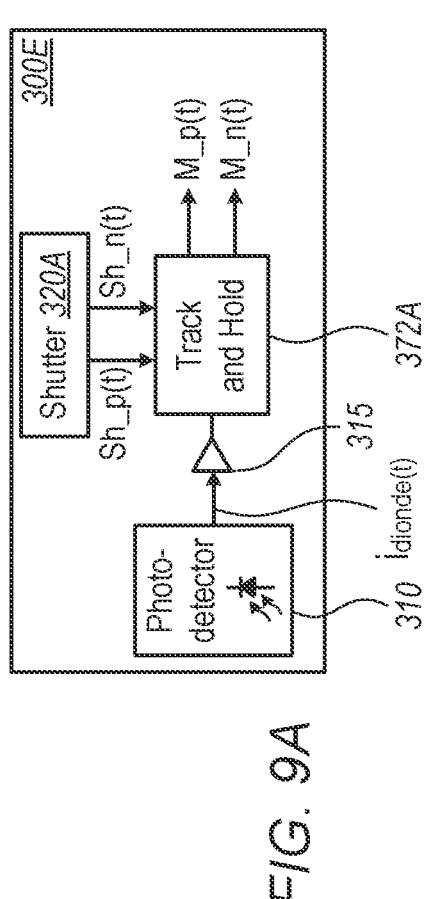
FIGS. 9A-9C are a block diagram and electronic circuit diagrams that schematically illustrate an imager employing a differential TAH circuit, and example circuits implementing the differential TAH circuit, in accordance with embodiments that are described herein.
Figure 9C:
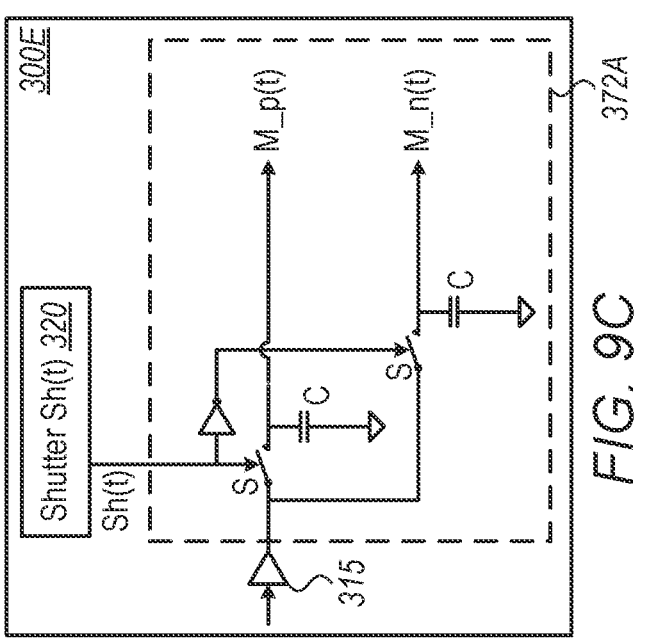
Figure 9B:
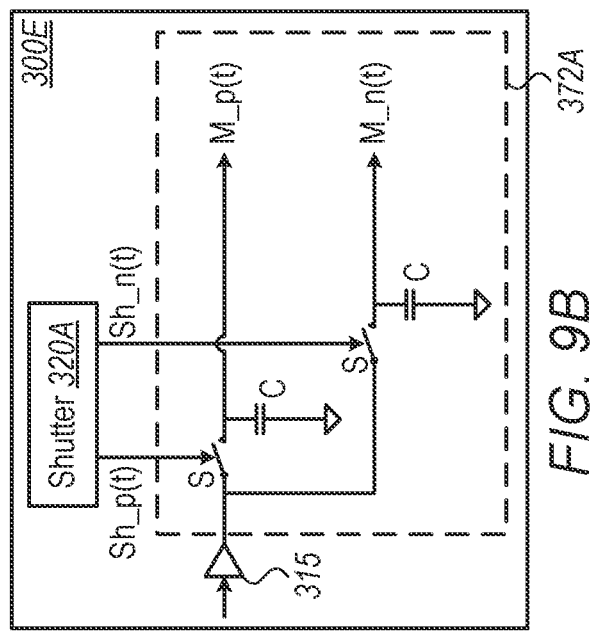

FIGS. 9A-9C are a block diagram and electronic circuit diagrams that schematically illustrate an imager 300E employing a differential TAH circuit 372A, and example circuits implementing the differential TAH, in accordance with embodiments that are described herein.

In FIG. 9A, a shutter 320A produces two chirp shutter signals denoted Sh_p(t) and Sh_n(t), The two chirp shutter signals operate in opposite phases, meaning that when Sh_p(t) is high, Sh_n(t) is low, and vice versa. Differential TAH circuit 374A has a differential output comprising two track-and-hold outputs denoted M_p(t) and M_n(t). The M_p(t) output is tracked when Sh_p(t) is high and sampled when Sh_p(t) is low. The M_n(t) output is tracked when Sh_n(t) is high and sampled when Sh_n(t) is low.

In FIGS. 9B and 9C, differential TAH circuit 374A comprises two TAH circuits, each of which comprising a switch S and a capacitor C. In FIG. 9C, shutter 320 produces a single chirp shutter signal Sh(t) that controls the first TAH circuit, and a logically inverted version of Sh(t) controls the second TAH circuit.

Figure 10A:
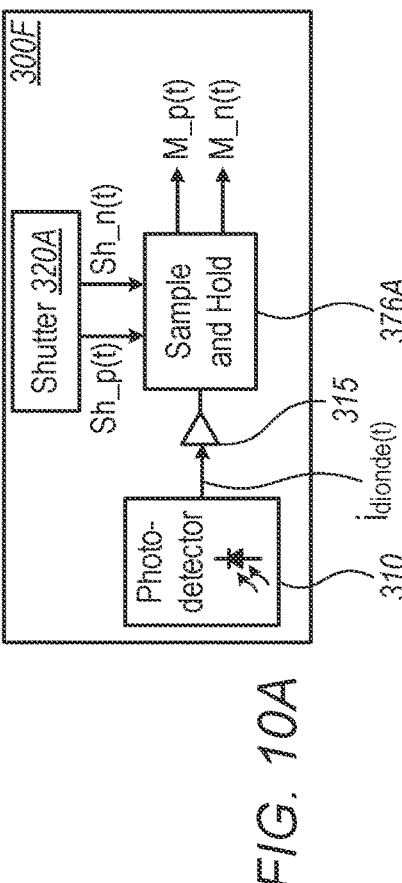
FIGS. 10A-10C are a block diagram and electronic circuit diagrams that schematically illustrate an imager employing a differential SAH circuit, and example circuits implementing the differential SAH circuit, in accordance with embodiments that are described herein.
Figure 10C:
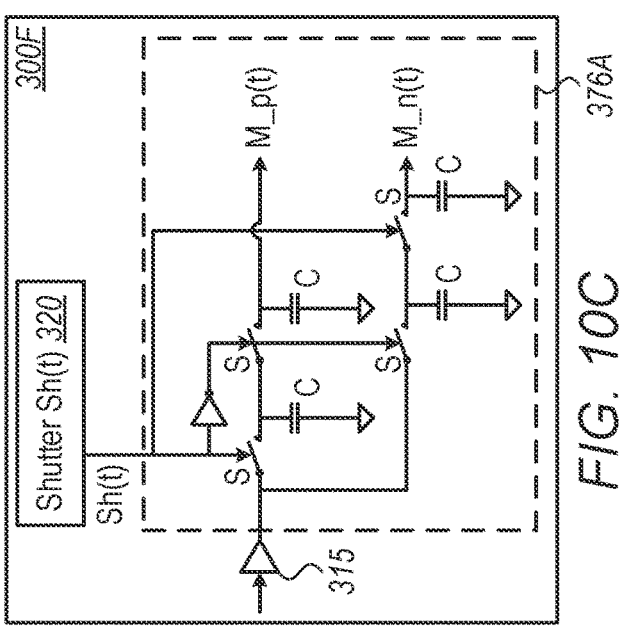
Figure 10B:
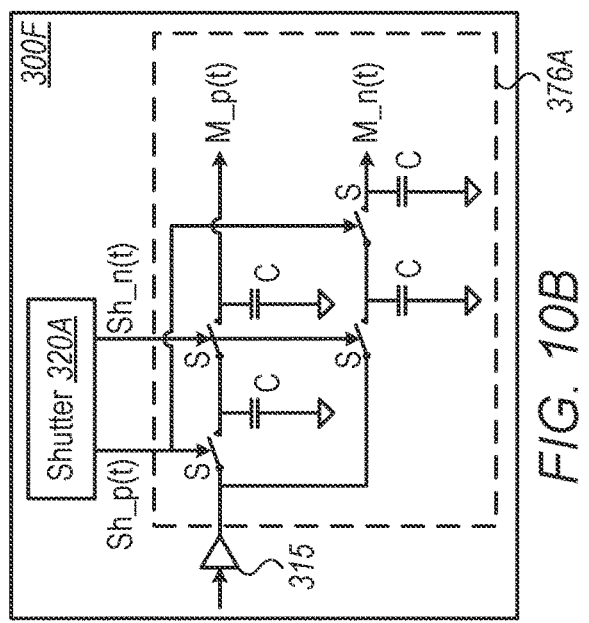

FIGS. 10A-10C are a block diagram and electronic circuit diagrams that schematically illustrate an imager 300F employing a differential SAH circuit 376A, and example circuits implementing the differential SAH circuit, in accordance with embodiments that are described herein.

In FIG. 10A, a shutter 320A produces two chirp shutter signals Sh_p(t) and Sh_n(t), operating in opposite phases. Differential SAH circuit 376 has a differential output comprising two sample-and-hold outputs denoted M_p(t) and M_n(t). The M_p(t) output samples the input signal on the falling edge of Sh_p(t) and holds it for a full period. The M_n(t) output samples the input signal on the falling edge of Sh_n(t) and holds it for a full period.

In FIGS. 10B and 10C, differential SAH circuit 376A comprises two SAH circuits, each of which comprising two switches S and two capacitors C. In FIG. 10B, Sh_p(t) controls the first switch in the first SAH circuit and the second switch in the second SAH circuit, and Sh_n(t) controls the second switch in the first SAH circuit and the first switch in the second SAH circuit. In FIG. 10C, shutter 320 produces a single chirp shutter signal Sh(t) that controls the first switch in the first SAH circuit and the second switch in the second SAH circuit. A logically inverted version of Sh(t) controls the second switch in the first SAH circuit and the first switch in the second SAH circuit.

The embodiments described above are given by way of example, and other suitable embodiments can also be used. For example, although in the embodiments described above the shutter (e.g., 320) that produces the chirp shutter signal is separate from the corresponding switched circuit (e.g., 372 or 376), in other embodiments the shutter and the switched circuit are combined together as a shutter.

The configurations of LIDAR system 10 of FIG. 1, LIDAR data flows of FIGS. 2 and 3, and imager variant implementations of FIGS. 7A, 7B, 8A, 8B, 9A-9C, and 10A-10C, are given by way of example, and other LIDAR system, LIDAR data flows, and imager variant implementations can also be used. Elements that are not necessary for understanding the principles of the present invention, such as various interfaces, addressing circuits, timing and sequencing circuits and debugging circuits, have been omitted from the figures for clarity.

Some elements of transmitter 30 and receiver 40 of LIDAR system 10, such as imager 42, signal processor 20, and DSPs 400 and 400A may be implemented in hardware, e.g., in one or more Application-Specific Integrated Circuits (ASICs) or FPGAs. Additionally or alternatively, signal processor 20 and DSPs 400 and 400A can be implemented using software, or using a combination of hardware and software elements.

In some embodiments, some functions of, signal processor 20 and DSP 400 and/or DSP 400A, may be carried out by general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Although the embodiments described herein mainly address LIDAR systems, the methods and systems described herein can also be used in other applications, such as in distance measurement applications, and in reflectometry.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A LIDAR system, comprising:
   a transmitter, which is configured to direct a sequence of illumination pulses toward a scene;
   a receiver, comprising:
   an array of photodetectors, which are configured to receive optical radiation reflected from the scene and to output respective signals in response to the received optical radiation;
   a shutter, which is configured to modulate the signals output by the photodetectors by applying a chirp shutter function, having a selected chirp period, to the signals; and
   a readout circuit, which is configured to sample and digitize the modulated signals in each of a plurality of sampling windows, which span the chirp period, thereby generating a corresponding plurality of digitized output signals; and
   a processor, which is configured to select respective sampling windows for the photodetectors, and to process the digitized output signals in the selected respective sampling windows to generate a depth map of the scene.

2. The LIDAR system according to claim 1, wherein the readout circuit is configured to integrate the sampled signals over each of the sampling windows.

3. The LIDAR system according to claim 1, wherein the processor is configured to calculate a time-frequency transform for the sampling windows in a given chirp period, and to select a sampling window in the given chirp period based on partial subsets of frequency-domain bins, corresponding respectively to the sampling windows.

4. The LIDAR system according to claim 3, wherein the processor is configured to calculate the time-frequency transform by calculating only the partial subsets of the frequency-domain bins.

5. A LIDAR system, comprising:
   a transmitter, which is configured to direct a sequence of illumination pulses toward a scene;
   a receiver, comprising:
   an array of photodetectors, which are configured to receive optical radiation reflected from the scene and to output respective signals in response to the received optical radiation;
   a shutter, which is configured to modulate the signals by applying an ascending chirp shutter function, having a selected chirp period, to the signals output by at least a first group of the photodetectors and simultaneously applying a descending chirp shutter function, having the same chirp period as the ascending chirp shutter function, to a load; and a readout circuit, which is configured to sample and digitize the modulated signals to generate digitized output signals; and a processor, which is configured to process the digitized output signals to generate a depth map of the scene.

6. The system according to claim 5, wherein the load comprises a second group of the photodetectors, different from the first group of the photodetectors.

7. A LIDAR system, comprising:

a transmitter, which is configured to direct a sequence of illumination pulses toward a scene;

a receiver, comprising:

an array of photodetectors, which are configured to receive optical radiation reflected from the scene and to output respective signals in response to the received optical radiation;

a shutter, which is configured to modulate the signals output by the photodetectors by applying a chirp shutter function, having a selected chirp period, to the signals, wherein the shutter comprises a switched circuit comprising a differential track-and-hold or a differential sample-and-hold circuit, which is controlled to apply the chirp shutter function; and a readout circuit, which is configured to sample and digitize the modulated signals to generate digitized output signals; and a processor, which is configured to process the digitized output signals to generate a depth map of the scene.

8. The LIDAR system according to claim 7, wherein the switched circuit is configured to reduce flicker noise using a chopping technique.

9. The LIDAR system according to claim 7, wherein the switched circuit comprises an integrating sampler comprising a transconductor stage followed by a sampler.

* * * * *